Feb. 20, 1962     F. RANALLI     3,021,567
METHOD FOR MOLDING ISOTACTIC POLYPROPYLENE
Filed May 13, 1958
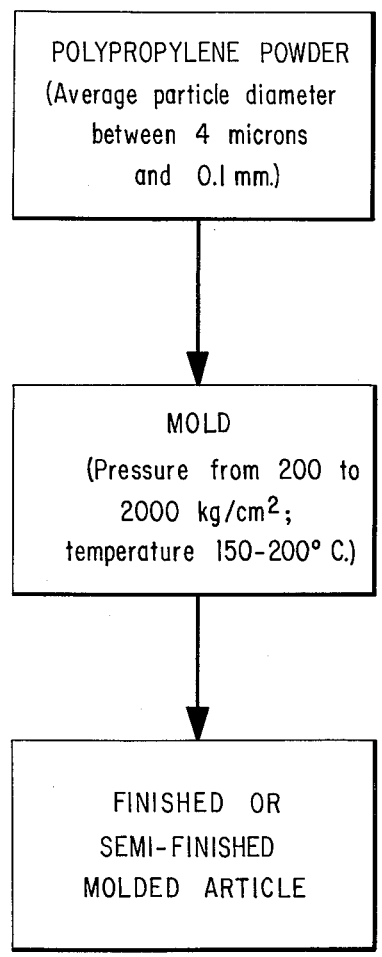
INVENTOR.
FRANCO RANALLI
BY
ATTORNEY

United States Patent Office

3,021,567
Patented Feb. 20, 1962

3,021,567
METHOD FOR MOLDING ISOTACTIC
POLYPROPYLENE
Franco Ranalli, Milan, Italy, assignor to Montecatini Societa Generale per l'Industria Mineraria e Chimica, a corporation of Italy
Filed May 13, 1958, Ser. No. 734,854
Claims priority, application Italy May 23, 1957
2 Claims. (Cl. 18—55)

This invention relates to the production of shaped articles or machinable blocks from highly isotactic and crystalline polypropylenes having very high molecular weights.

Recently, G. Natta and his co-workers have disclosed entirely new linear, regular head-to-tail polymers of the alpha-olefins, including propylene. The polymers have entirely different steric structures which Natta has termed "isotactic" and "atactic," respectively.

"Isotactic" defines a stereoregular structure characterized in that, assuming the macromolecule main chain to be fully extended in a plane, the R groups ($-CH_3$ in the case of propylene) bound to the tertiary asymmetric carbon atoms of adjacent monomeric units are, on the same chain section, all on one side of the plane and the hydrogen atoms bound to those carbon atoms are on the opposite side of the plane. Isotactic macromolecules according to Natta et al. are macromolecules which have substantially the isotactic structure. Isotactic polymeric alpha-olefins according to Natta et al. are polymers made up of the isotactic macromolecules. Isotactic polypropylene according to Natta et al. is characterized in that it is non-extractable with boiling n-heptane.

The "atactic" structure, on the other hand is stereoirregular and characterized in that, again assuming that the macromolecule main chain is fully extended in a plane, the R groups and hydrogen atoms bound to the tertiary asymmetric carbon atoms of adjacent monomeric units are randomly distributed on the two sides of the plane.

Natta et al. have shown that in general when the alpha-olefin is polymerized with the aid of a catalyst prepared from a halide of a transition metal of Groups IV to VI of the Periodic Table (Mendeleef) of the type of $TiCl_4$ and an organometallic compound of a metal of Groups II to III of said table, the two sterically different polymers occur in admixture in the crude polymerizate and can be separated on the basis of their different steric structures by means of selective solvents.

Natta et al. have also shown that with the use of special catalysts prepared from the organometallic compound and a low valency transition metal halide such as violet $TiCl_3$, the polymerization of the alpha-olefin is oriented to the direct production of prevailingly (over 60%) to substantially completely isotactic polymers. Thus, as Natta et al. have shown, using the catalyst prepared by starting with violet crystalline $TiCl_3$ and mixing the violet $TiCl_3$ with, e.g., triethyl aluminum, propylene can be polymerized directly to a crude polypropylene which is less than 40%, preferably less than 25%, extractable with boiling n-heptane.

The term "isotactic" is not synonymous with crystalline because the isotactic structure exists and persists independently of the physical state of the polymer. However, the isotactic polymers are crystallizable, may be crystalline under appropriate conditions, and if highly isotactic are highly crystalline.

Up to now, in practice, the highly isotactic polypropylene i.e., polypropylene having a very high content of isotactic macromolecules, have been formed into shaped articles by injection molding and die casting processes.

The use of those shaping methods requires polymers which have a well-defined range of molecular weights and which are capable of fusing under heating to form a fluid mass.

The highly isotactic polypropylenes often have molecular weights so high that they cannot be shaped by the injection molding or die-casting methods, unless they are first subjected to degradation treatments for reducing the molecular weight. Such degrading (depolymerizing) treatments are expensive and difficult to control so that serious damage to the mechanical properties of the polymer is avoided.

An object of this invention is to provide a method of forming highly isotactic polypropylene into shaped articles, regardless of the molecular weight of the polymer.

Another object is to provide a method of forming very high molecular weight, highly isotactic polypropylene into shaped or semi-finished articles, without having to subject the polymer to special degrading treatments.

These and other objects are accomplished by this invention in accordance with which we have found that, no matter how high the molecular weight of the polypropylene may be, it can be formed into shaped or semi-finished articles by subjecting it, in suitable molds and in the form of a fine powder, to the combined action of selected pressures and temperatures.

The process of our invention is illustrated in the accompanying flowsheet.

In order to mold the very high molecular weight polymers successfully, several conditions must be observed. In the first place, the polypropylene powder introduced into the mold (preferably under vacuum in order to eliminate any air pockets embodied in the powder) must have a certain size, that is, the particles must have an average diameter from 4 microns to 0.1 mm. Secondly, the powder must be heated in the mold to approximately the first order transition temperature of the polymer or to a temperature slightly (5–30° C.) above the 1st order transition temperature. Thirdly, the powder, during heating thereof, must be subjected to a pressure of from 200 to 2,000 kg./$cm.^2$ or even higher.

When these three interdependent conditions are observed, the particles of the polypropylene powder partially melt and, under the pressure exerted thereon, agglomerate to form a uniform continuous mass which has good mechanical characteristics.

In practice, the molding process of the invention can be carried out in two different ways. Thus, the pressed mass of polypropylene particles can be heated to 170° C. to 190° C. while it is held in the closed mold until a compact and coherent machinable mass is obtained, or, in the alternative, the pressed mass may be heated to a temperature below its first order transition temperature and then withdrawn from the mold as a uniform mass which is not yet completely coherent and placed in a liquid or gaseous heating medium maintained at 170–190° C. in which it is subjected to a pressure of from 1 to 20 atm. until the mass is completely coherent.

The last-mentioned procedure has the advantage that it permits of a higher rate of production because the time required for heating and cooling the mold in the press is reduced. However, that method is more adapted to the production of semi-finished articles than to the production of finished pieces.

When the shaping is carried out at temperatures below the 1st order transition temperature of the polypropylene, the granulometric properties of the powder are important in determining the compression time. In order to shorten significantly the time required for the powder to be held in the mold, it is necessary to use a homogeneous fine powder consisting of granules of essentially the same size. Preferably, the particles should have a size such that they all pass through a sieve of 900 mesh per square centimeter.

The molds in which the polypropylene powder is shaped in accordance with this invention are of the automatic or semi-automatic type and are preferably mounted on a hydraulic press which serves to open and close the molds and to apply the pressure on the polypropylene contained in the molds.

The molds can be heated by circulating steam under pressure in a suitable jacket or by electric resistance so distributed in the molds as to assure uniformity of the heat supplied to the polymer and uniform sintering of the polypropylene particles. The compressed masses may be cooled in the molds by circulating cold water through the jackets.

The following examples are given to illustrate the invention, it being understood that these examples are not intended as limiting.

*Example 1*

200 g. of a powdered highly (over 80%) isotactic and crystalline polypropylene having a molecular weight of 1,000,000 are charged into a stainless steel mold having an inner diameter of 150 mm. and a height of 150 mm., provided with a tight-fitting piston, and mounted on a hydraulic plate press.

The mold is then evacuated in order to eliminate the air pockets. It is heated to 180° C. under a pressure of 200 kg./cm.$^2$ for 30 minutes, to obtain a compact block which can be machined readily to produce pieces of any desired type, such as threaded sleeves, pulleys, gears, etc.

*Example 2*

200 g. of a powdered highly isotactic and crystalline polypropylene having a molecular weight of 1,000,000, are charged into stainless steel molds as described in Example 1.

The powder can be introduced into the molds at any temperature between 20° C. and 130° C., and is pressed in the mold for one minute at about 200 kg./cm.$^2$. The pressed mass is then withdrawn from the mold and is heated in ethylene glycol at a temperature of about 175° C. until a compact, machinable block is obtained. A heating time of one hour in the hot liquid is sufficient.

*Example 3*

20 g. of a powdered, highly isotactic polypropylene having a molecular weight of 1,000,000 and pre-heated to 120° C. are charged under vacuum into a stainless steel mold having a diameter of 50 mm. and a height of 150 mm., and provided with a tight piston.

The powder is subjected to a pressure of 1600 kg./cm.$^2$ for 2 minutes in a hydraulic press. The resulting block, which is not yet completely compacted and coherent, is removed from the mold and annealed at 180° C. for 30 minutes under nitrogen and at a pressure of 1 to 4 kg./cm.$^2$. A perfectly machinable block is thus obtained.

*Example 4*

20 g. of a highly isotactic powdered polypropylene having a molecular weight of 1,000,000 are charged at a temperature between 20° C. and 30° C. into a stainless steel mold having an inner diameter of 50 mm., a height of 150 mm., and provided with a tight piston.

The powder in the mold is subjected to a pressure of 1600 kg./cm.$^2$ for 2 minutes in a hydraulic press. The resulting compact but not completely coherent block which is removed from the mold is then annealed in an atmosphere of steam at a pressure of 6–7 atms. for 60 minutes. The final block is perfectly machinable.

*Example 5*

Example 4 is repeated, except that the compact but not completely coherent block removed from the mold is heated at 170–175° C. in ethylene glycol for 60 minutes and then placed, at 170–175° C., in a mold maintained at 130° C. and provided with a matrix die and a punch of predetermined shape.

By applying rapidly the strongest closing force obtainable with the hydraulic press (60 tons) it is possible to obtain a finished piece which has the same size as the mold, is perfectly coherent, and can be removed from the mold as soon as it is cooled to about 100° C.

The polypropylene powders used in the foregoing examples were composed of particles having average diameters within the range of 4 microns to 0.1 mm.

Polypropylene of any molecular weight can be shaped according to the present invention. However, the invention is of particular and special value in connection with the direct shaping of polypropylenes having very high molecular weight, e.g., an average molecular weight of 1,000,000 or higher, and such high viscosities when heated that they normally cannot be shaped by other methods such as extrusion, injection molding, or die-casting, without prior depolymerization to lower molecular weights.

The molecular weight of the polypropylene was determined by means of the viscosimetric method (the intrinsic viscosity of polypropylene was measured in tetralin at 135° C.).

Various changes and modifications may be made in details in practicing the invention without departing from the spirit thereof. Therefore, it is intended to include in the scope of the appended claims any and all such modifications as may be apparent to those skilled in the art.

What is claimed is:

1. A process for molding machinable finished and semi-finished masses comprising highly isotactic and crystalline polypropylene having a high molecular weight which comprises subjecting the polypropylene, in the form of a powder the particles of which have an average diameter between 4 microns and 0.1 mm. to a pressure of at least 200 kg./cm.$^2$ at a temperature of between 150° C. and 200° C. until a compact coherent machinable mass is obtained.

2. A process for molding highly isotactic and crystalline polypropylene having a high molecular weight which comprises placing the polypropylene, in the form of a powder the particles of which have an average diameter between 4 microns and 0.1 mm., in a mold, and subjecting the powder in the mold to a pressure of from 200 to 2000 kg./cm.$^2$ at a temperature between 150° C. and 200° C., until a compact, coherent, machinable mass is obtained, and then cooling the mass and removing it from the mold.

References Cited in the file of this patent

UNITED STATES PATENTS

| | | |
|---|---|---|
| 2,400,094 | Benning | May 14, 1946 |
| 2,456,262 | Fields | Dec. 14, 1948 |
| 2,698,966 | Stott et al. | Jan. 11, 1955 |
| 2,824,090 | Edwards et al. | Feb. 18, 1958 |

FOREIGN PATENTS

| | | |
|---|---|---|
| 538,782 | Belgium | Dec. 6, 1955 |

OTHER REFERENCES

Natta: "How Giant Molecules are Made," Scientific American, September 1957, pp. 98–104.